United States Patent [19]
Mueller et al.

[11] 3,742,097

[45] June 26, 1973

[54] PROCESS FOR PREPARING DIADDUCTS OF HYDROCARBYLTHIOPHOSPHORIC ACIDS

[75] Inventors: Wolfgang H. Mueller, Karlsruhe, Germany; Alexis A. Oswald, Mountainside, N.J.

[73] Assignee: Esso Research and Engineering Company, Linden, N.J.

[22] Filed: Dec. 10, 1969

[21] Appl. No.: 884,046

Related U.S. Application Data
[62] Division of Ser. No. 541,135, April 8, 1966, abandoned.

[52] U.S. Cl. .......... 260/968, 204/162, 204/162 HE, 260/932, 260/948, 260/949, 260/957, 260/978, 424/216
[51] Int. Cl. ........................... C07f 9/16, A01n 9/36
[58] Field of Search ............................ 260/948, 968

[56] References Cited
UNITED STATES PATENTS
2,952,700   9/1960   Lorenz et al........................ 260/948

*Primary Examiner*—Lewis Gotts
*Assistant Examiner*—Anton H. Sutto
*Attorney*—Chasan and Sinnock and John P. Corcoran

[57] ABSTRACT

Sequential diadducts of methylacetylene are obtained in radical reactions with a dihydrocarbyl thiophosphoric acid and then with a hydrocarbon thiol. The order of addition is critical in obtaining novel compositions which are attractive as pesticides since their high effectiveness is coupled with a surprisingly low toxicity towards mammalians.

5 Claims, No Drawings

PROCESS FOR PREPARING DIADDUCTS OF HYDROCARBYLTHIOPHOSPHORIC ACIDS

This invention is a divisional application of Ser. No. 541,135 filed Apr. 8, 1966, now abandoned entitled "Adducts of Hydrocarbylthiophosphoric Acids and Preparation Thereof" in the name of Wolfgang H. Mueller and Alexis A. Oswald.

This invention relates to a novel process for preparing new and valuable organophosphorus compounds. More particularly, this invention relates to the preparation of new esters of dihydrocarbyl thiophosphoric acids, derived from methylacetylene via sequential diaddition. A particularly preferred embodiment of this invention relates to the monoaddition of a dihydrocarbyl thiophosphoric acid followed by the addition of an organic thiol to produce new mixed diadducts of methylacetylene. These diadducts could not be made by known processes. They have an unexpected advantage as pesticides over structurally related thiophosphates by virtue of their reduced toxicity towards mammalians.

The reaction between 0,0'-dihydrocarbyl thiophosphoric acids and a variety of unsaturated organic compounds is known to produce adducts of the unsaturate. Some of these adducts were found to possess properties which make them suitable as lubricating oil additives and/or pesticides. This in turn stimulated interest in new, superior adducts, and novel, more selective methods of addition.

Pesticidal compounds formed by the free radical addition of 0,0'-dialkyl thiophosphoric acids to acetylenes are disclosed in U.S. Pat. No. 3,067,232. The monoadducts of methylacetylene, i.e., S-propenyl dialkyl thiophosphates, have been tested in the present invention for destroying a variety of insect pests. However, the toxicity of these particular compounds to warm-blooded animals, including humans, has been found to be quite high. Thus, the use of such compounds as pesticidal agents is severely restricted. It has now been discovered that the monothiophosphoric acid esters, resulting from the addition of 0,0'-dihydrocarbyl thiophosphoric acids to methylacetylene, can be further reacted with an organic thiol to produce novel, mixed diadducts of methylacetylene, having excellent pesticidal activity and a low level of toxicity towards warm-blooded animals. Additionally, it has now been discovered that the monothiophosphoric acid esters, i.e., S-propenyl dihydrocarbyl thiophosphates, can be prepared in significantly increased yields; when a stoichiometric excess of the acid reagents is used, thus providing a most efficient route to the mixed diadducts.

In accordance with this invention, monoadducts of methylacetylene may be obtained in high yields by reacting a stoichiometric excess of a dihydrocarbyl thiophosphoric acid with methylacetylene under free radical addition conditions. In a preferred embodiment, the monoadduct, i.e. S-propenyldihydrocarbylthiophosphate, is utilized to prepare novel, mixed, diadducts of methylacetylene by free radical addition of an organic thiol.

In our copending patent application, U.S. Ser. No. 518,028 now abandoned, it is disclosed that the use of excess dithiophosphoric acid results in the formation of the diadduct of methylacetylene, e.g.: 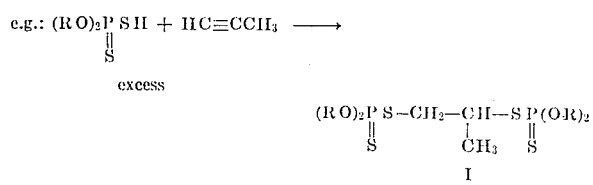

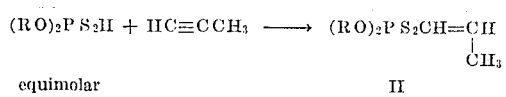

the monoadduct forming only when equimolar amounts of the reactants are employed, e.g.:

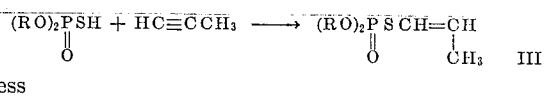

Thus, it was believed that the reaction of methylacetylene with excess monothiophosphoric acid would similarly lead to formation of a diadduct. However, it has now been discovered that the use of excess monothiophosphoric acid in the reaction with methylacetylene does not lead to the diadduct, but rather, leads to significantly increased yields of the monoadduct, e.g.:

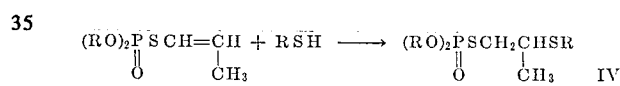

Thus, the monoadduct of methylacetylene may now be prepared in yields which are at least 50 percent greater than that previously thought possible.

While the methylacetylene monoadducts of dihydrocarbyl thiophosphoric acid are unreactive towards an excess of the acid, they react with an organic thiol in a very specific manner:

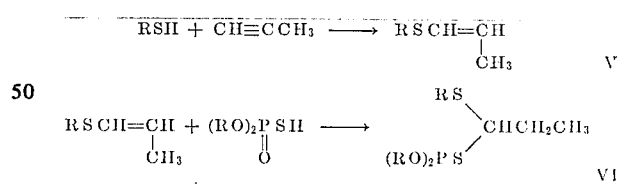

It is surprising that the resulting free radical type sequential adducts cannot be formed by a reversed sequence of addition. If instead of the acid, the thiol is reacted at first with the methylacetylene, the subsequent addition occurs in an ionic manner. As a result, mixed diadducts of a different type are formed as shown by the following reaction equations:

RSH + CH≡CCH₃ ⟶ RSCH=CH—CH₃   V

RSCH=CH + (RO)₂PSH ⟶ RS\\CHCH₂CH₃ /(RO)₂PS   VI
    |
   CH₃       ‖
              O

The novel sequential diadducts of the present invention, Type IV, were found to be particularly and unexpectedly desirable for pesticidal use. When compared to pesticidal phosphate esters of somewhat similar structure, they showed a relatively low level of toxicity towards warm-blooded animals, i.e., a greater level of safety when used as pesticides. For example, the median lethal oral dose for the known commerical compound "Thiol-Systox,"

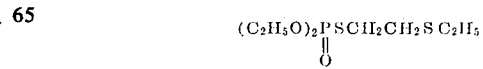

is about 1.5 mg. per body kg. See page 343 of the monograph entitled "Die Entwicklung neuer Insektizider Phosphorsäure-Ester," by Gerhard Schrader, which was published by Verlag Chemie Gmbh., Weinheim/Bergstr., Germany in 1963. In contrast, our sequential methylacetylene diadduct of closely related structure,

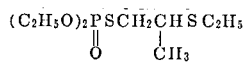

has a median lethal oral dose of more than 75 mg per body kg. This means that our diadduct is about 50 times safer to use.

The methyl branching of the sequential adducts of the present application is apparently reducing their toxicity towards mammalians. It is important that the methyl branching of our adducts is on a $\beta$ - rather than on an $\alpha$ - carbon atom relative to the thiophosphate moiety. Since all of our adducts have the $\alpha$ - unsubstituted primary thiophosphate ester structure, they are more stable than the secondary or tertiary ester structures. From a practical viewpoint, this stability is very important. For example, the hydrolytic stability is essential when these compounds are to be used as an aqueous emulsion for pesticidal spray applications.

The monoadduct of methylacetylene, i.e., S-propenyl dihydrocarbyl thiophosphate, may be prepared by reacting methylacetylene with a dihydrocarbyl thiophosphoric acid in the presence of a free radical initiator. In general, the type of thiophosphoric acids applicable to this invention may be represented by the following formula:

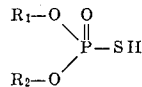

wherein $R_1$ and $R_2$ when taken separately may each be a radical selected from the group consisting of $C_1$-$C_{30}$ alkyl, $C_6$-$C_{10}$ aryl and alkaryl, $C_6$-$C_{10}$ halo-substituted aryl, and $C_6$-$C_{10}$ nitro-substituted aryl; but are preferably the same and are $C_1$-$C_5$ alkyl or $C_6$-$C_9$ aryl, more preferably, $C_1$-$C_3$ alkyl; and when $R_1$ and $R_2$ are taken together, they form a bridge between the oxygen atoms, and may be $C_1$-$C_{30}$ alkylene or $C_6$-$C_8$ phenylene, but are preferably $C_1$-$C_5$ alkylene.

It is most preferred that $R_1$ and $R_2$ should be methyl and ethyl.

Suitable examples of $R_1$ and $R_2$ taken separately include: (a) methyl, ethyl, propyl, isopropyl, butyl, pentyl, octyl, decyl, pentadecyl, octadecyl, dodecyl, eicosyl, docosyl, and triacontyl; (b) phenyl, dimethylphenyl, xylyl and naphthyl; (c) 4-chlorophenyl, 3-bromophenyl, 4-iodiphenyl, fluorophenyl, o-chlorotoluyl, dichlorotoluyl, trichlorophenyl; (d) 2-nitrophenyl, 3-nitro-toluyl, 2-nitro-m-xylyl, 2,5-dinitro-m-xylyl; (e) 4-methylthiophenyl, methyl sulfonylphenyl; and (f) cyanophenyl.

Suitable examples of $R_1$ and $R_2$ taken together include arylenes, such as phenylene and bivalent alkylenes represented by the formula $C_nH_{2n}$, wherein $n$ is an integer of from 1 to 30, e.g., methylene, ethylene, propylene, octadecylene, etc. The alkylene group can be a nonbranched polymethylene unit or a branched alkylene moiety. The resulting heterocyclic ring is preferably five and six membered.

Some examples of suitable dihydrocarbyl monothiophosphoric acid adding agents include: dimethyl thiophosphoric acid, diisopropyl thiophosphoric acid, dioctyl thiophosphoric acid, ditriacontyl thiophosphoric acid, ethyl isopropyl thiophosphoric acid, trimethylene thiophosphoric acid, diphenyl thiophosphoric acid, dihexadecylphenyl thiophosphoric acid, dichlorophenyl thiophosphoric acid, dibenzyl thiophosphoric acid, ethyl benzyl thiophosphoric acid.

The monoadduct is prepared in significantly increased yields by utilizing a stoichiometric excess of the dihydrocarbyl-thiophosphoric acid. In order to realize this significant increase in monoadduct yield, the thiophosphoric acid should be employed in at least a 25 molar percent excess over the stoichiometric amount required for monoadduct formation. Preferably, however, a 50 to 200 percent excess should be employed, although greater amounts of thiophosphoric acid, i.e., up to 2,500 percent excess, may be satisfactorily employed.

The temperature at which the dihydrocarbyl thiophosphoric acid and methylacetylene are reacted also varies over a broad range; and, in general, is between about $-100°$ C. and about $+100°$ C., preferably between about $-20°$ C. and about $+80°$ C., and more preferably at about room temperature, i.e., between about $16°$ C. and about $28°$ C. The reaction can also be performed over a wide range of pressures, e.g., between about 0.1 atmosphere and about 100 atmospheres, but preferably is carried out under atmospheric or autogenous pressures.

The reaction to prepare the S-propenyl dihydrocarbyl thiophosphates may be carried out in the presence of an inert diluent; however, it is preferred that a diluent not be employed. Suitable diluents which may be employed, if desired, include: $C_2$-$C_{10}$ aliphatic hydrocarbons, $C_5$-$C_{10}$ cycloaliphatic hydrocarbons, ethers, and thioethers.

The free radical catalyst employed to initiate the reaction between the methylacetylene and the dihydrocarbyl thiophosphoric acid is, in general, any of the organic or inorganic compounds which are conventionally employed as free radical initiators. In addition, non-chemical free radical initiators, such as ultraviolet light or gamma irradiation and heat can be employed; ultraviolet light being preferred.

The source of ultraviolet light or gamma (X-ray) radiation is not critical. A 70-watt high pressure mercury arc lamp, emitting light of a wide spectrum wavelength, can be suitably employed in the laboratory; however, any source of ultraviolet light regardless of the quantity of wattage can be used. Of course, the more intense the source, the faster the reaction proceeds. In the case of gamma irradiation, a 1,000 to 10,000 Curie $Co^{60}$ source is, for example, suitable to initiate the above-described reaction from a distance of 6 cm.

With respect to the chemical free radical initiators, a wide variety of organic peroxides, hydroperoxides, per-esters, per-acids and azo-compounds can be employed. Examples of suitable chemical free radical initiators include: 2,4-dichlorobenzoyl peroxide, lauroyl peroxide, methylethyl ketone peroxide, decanoyl peroxide, caproyl peroxide, acetyl peroxide, benzoyl peroxide, p-chlorobenzoyl peroxide, hydroxy heptyl peroxide, bis(1-hydroxycyclohexyl) peroxide, dicumyl peroxide, cyclohexanone peroxide, cumene hydroperoxide, t-butyl hydroperoxide, bis-t-butyl peroxide and azobisisobutyronitrile.

The amount of chemical free radical initiator employed to promote said reaction can vary over a broad range; but, in general, will vary between about 0.05 and about 5.0 mole percent, based on the total amount of reactants.

The S-propenyl dihydrocarbyl thiophosphates prepared in accordance with the free radical catalyzed reaction described hereinabove, can be depicted by the following formula:

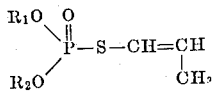

wherein $R_1$ and $R_2$ are hydrocarbon radicals as described hereinabove with respect to the definition of the dihydrocarbyl thiophosphoric acids.

Examples of the S-propenyl dihydrocarbyl thiophosphate intermediate products of the present application include: S-propenyl dimethyl thiophosphate, S-propenyldiisobutenyl thiophosphate, S-propenyl dicetyl thiophosphate, S-propenyl ditolyl thiophosphate, S-propenyl dinaphthyl thiophosphate, S-propenyl dioctadecylphenyl thiophosphate, S-propenyl dichlorobenzyl thiophosphate, S-propenyl ethyl benzyl thiophosphate.

In preparing the novel mixed diadducts of the present process, the S-propenyl dihydrocarbyl thiophosphate is reacted, in the presence of a free radical initiator, with an organic thiol. Organic thiols which can be employed in the present process are represented by the following general formula:

$$R_3 - SH$$ 

wherein $R_3$ is selected from the group consisting of $C_1$–$C_5$ alkyl, $C_6$–$C_{10}$ aryl, $C_6$–$C_{10}$ alkaryl, $C_6$–$C_{10}$ aralkyl, halo-substituted $C_6$–$C_{10}$ aryl and nitro-substituted $C_6$–$C_{10}$ aryl. Preferably, $R_3$ is a $C_1$–$C_5$ alkyl, a $C_6$–$C_9$ aryl; most preferably R is $C_1$–$C_2$ alkyl.

Suitable examples of organic thiols include: methanethiol, ethanethiol, n-propanethiol, isopropanethiol, n-butanethiol, benzenethiol, alpha-naphthalenethiol, o-toluenethiol, alpha-toluenethiol, 4-chlorobenzenethiol, 4-nitrobenzenethiol, 3-chloro-p-toluenethiol, 2,4-dichlorobenzenethiol and 4-methylmercaptobenzenethiol, phenylethanethiol.

The free radical reaction between the S-propenyldihydrocarbylthiophosphate and the organic thiol can be carried out at a temperature of between about −80° C. and about +50° C., preferably between about 0° C. and about 40° C. When irradiation is employed to initiate the reaction, the temperature preferably varies between about 0° C. and about +30° C., and more preferably is performed at ambient temperatures, i.e., between about 16° C. and about 28° C. The preferred temperature range in the case of chemical initiators depends on the decomposition temperature of the peroxidic compound utilized. Pressures employed are in general, atmospheric or autogenous; the latter up to about 20 atmospheres.

The mole ratio of the organic thiol to the S-propenyl dihydrocarbylthiophosphate can vary between about 1:1 and about 10:1. An excess of the organic thiol compound is preferred, i.e., molar ratios of 2:1 to 10:1, e.g., 3:1.

The preparation of the mixed diadduct of the present process can be catalyzed by any conventional free radical initiator, both chemical and non-chemical. Any of the free radical initiators and their amounts described hereinabove with regard to the reaction between the dihydrocarbyl thiophosphoric acid and methylacetylene can be employed to catalyze the reaction between the organic thiol and the S-propenyl dihydrocarbyl thiophosphate.

Suitable diluents can be employed for the preparation of the novel mixed diadducts of the present process and those described in connection with the preparation of the S-propenyl dihydrocarbyldithiophosphates are typical examples thereof. However, it is preferred not to use a diluent for the preparation of the mixed diadduct.

The novel mixed diadducts of the present process can be represented by the following formula:

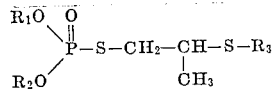

wherein $R_1$, $R_2$ and $R_3$ are radicals as described hereinabove with respect to the definition of the dihydrocarbyl thiophosphoric acids and the organic thiols, respectively.

Some of the examples of the novel sequential diadducts include: dimethyl 2-ethylthiopropyl thiophosphate, diethyl 2-methylthiopropyl thiophosphate, ethyl propyl S-2-methylthiopropyl thiophosphate, diethyl S-2-phenylthiopropyl thiophosphate, diethyl S-2-p-chlorophenylthiopropyl thiophosphate, diethyl S-2-p-methylthiophenylthiopropyl thiophosphate, diethyl S-2-p-cyanophenylthiopropyl thiophosphate, ditriacontyl S-2-p-dodecylphenylthiopropyl thiophosphate, ethyl benzyl S-2-phenylthiopropyl thiophosphate, dibenzyl S-2-methylthiopropyl thiophosphate, diphenyl S-2-dichlorobenzylthiopropyl thiophosphate, didodecylphenyl S-2-phenylthiopropyl thiophosphate.

The new diadducts are useful as pesticides. Some of them are outstanding systemic pesticides relatively safe to use. Others are contact insecticides. A few of them, due to their low toxicity, have a high potential for controlling animal insects. Of course, dependent on their particular structure, they possess different degrees of attractiveness for the various useful applications. Various concentrations of the different diadducts may be required as active ingredients in pesticidal compositions to provide effective insect control.

For example, the particularly attractive sequential diadducts from the viewpoint of systemic plant insecticide applications are those having a significant degree of solubility in water. Water solubility allows such compounds to be transported in the plant sap from the roots to the leaves. In terms of substituents this means that from this viewpoint the most desirable diadducts have their $R_1$, $R_2$ and $R_3$ groups selected from methyl and ethyl groups.

From the viewpoint of contact insecticidal and fungicidal activity on the other hand one may wish to select aromatic radical substituents, particularly for $R_3$.

The novel mixed diadducts of the present invention can be employed as pesticidal compositions in either a solid or liquid form. When used in a solid form, they may be reduced to an impalpable powder and applied as an undiluted dust or mixed with a solid carrier such as clay, talc and bentonite, as well as other inert carriers known in the art. The mixed diadduct can also be applied as a spray in a liquid carrier either as a solution in a solvent or in an emulsion in a nonsolvent such as water. In the diluted solid or liquid form, the mixed diadducts of the present invention can be employed in an amount of between about 0.0001 and about 15.0 wt. percent, based on the inert carrier. Typical liquid solvents include such compounds as acetone, ethyl alcohol, benzene, naphtha, etc. Suitable wetting agents and emulsifying agents can also be employed in preparing the pesticidal compositions. The mixed diadducts of the present process can also be admixed with carriers that are themselves pesticides. Finally, the active compounds of the present invention can be used without dilution as an atomized mist.

EXAMPLE 1

A mixture of 17 grams (0.1 mole) of 0,0'-diethyl thiophosphoric acid and 2 grams (0.05 mole) of methylacetylene was irradiated with ultraviolet light in a sealed quartz tube under its own vapor pressure at 17° C. for 40 hours. Semi-quantitative proton nuclear magnetic resonance (NMR) analysis of the product mixture indicated 60 mole percent of 0,0'-diethyl S-(1-propenyl) thiophosphate and no diadduct. The unreacted methylacetylene was removed under vacuum. The product mixture was then dissolved in ether and the unreacted acid removed by washing with 5 percent aqueous sodium bicarbonate solution. Evaporation of the ether afforded 6.08 grams (57 percent) of a tan liquid product which was 98 percent pure on gas liquid chromatographical (GLC) analysis. Fractional distillation yielded the pure product, b.p. 69.5°–70° (0.20 mm Hg), $n_D^{20}$ 1.4756.

Anal. Calcd. for $C_7H_{15}O_3SP$: C, 40.00; H, 7.14; P, 14.76; S, 15.23. Found: C, 40.42; H, 7.21; P, 14.55; S, 15.15.

EXAMPLE 2

A mixture of 59.4 grams (0.3 mole) of 0,0'-diisopropyl thiophosphoric acid and 4.0 grams (0.1 mole) of methylacetylene was reacted and worked up as described in Example 1. The crude product was a yellow liquid (16.26 grams, 68 percent yield) which contained 10 percent of diisopropyl hydrogen phosphite already present in the acid employed. Fractional distillation afforded 0,0'-diisopropyl S-(1-propenyl) thiophosphate of 99 percent purity (GLC), b.p. 79°–80° (0.40 mm Hg); $n_D^{20}$ 1.4651.

Anal. Calcd. for $C_9H_{19}O_3PS$: C, 45.36; H, 8.04; P, 12.99; S, 13.45. Found: C, 45.67; H, 8.39; P, 12.11; S, 13.45.

EXAMPLE 3

A mixture of 51 grams (0.35 mole) of 0,0'-dimethyl thiophosphoric acid and 3.8 grams (0.96 mole) of methylacetylene was irradiated for 87 hours as in earlier examples. A subsequent analysis by NMR indicated an approximate conversion of 32 percent. The corresponding amount of crude, neutral monoadduct was obtained after the removal of the unreacted acid with the procedure described in Example 1. Fractional distillation yielded 0,0'-dimethyl S-(1-propenyl) thiophosphate of 96 percent purity (GLC) as a colorless liquid boiling at 63°–64° (0.3 mm Hg.).

Anal. Calcd. for $C_6H_{11}O_3PS$: C, 32.96; H, 6.08; S, 17.54. Found: C, 33.02; H, 6.15; S, 17.61.

EXAMPLE 4

A mixture of 17 grams (0.1 mole) of 0,0'-diethyl thiophosphoric acid and 4 grams (0.1 mole) of methylacetylene was reacted and worked up as described in Example 1. Fractional distillation afforded a product of 0,0'-diethyl S-(1-propenyl) thiophosphate in 35 mole percent yield and no diadduct.

Additional reactions of equimolar amounts of 0,0'-diethyl- and 0,0'-diisopropyl thiophosphoric acid with methylacetylene result in monoadduct yields ranging from 35 to 40 mole percent. Thus, a comparison of the results in Examples 1, 2, and 4 clearly show that excess monothiophosphoric acid significantly increases the yield of the monoadduct, i.e., approximately 50 percent in Example 1 over Example 4, and approximately 70 percent in Example 2 over Example 4.

EXAMPLE 5

A mixture of 34 grams (0.2 mole) of 0,0'-diethyl thiophosphoric acid and 4 grams (0.1 mole) methylacetylene was heated in a sealed Pyrex pressure tube, at 50° C. for 24 hours. The tube was then opened at room temperature and evacuated down to a pressure of 40 mm to remove the unreacted methylacetylene. The residual contents were then dissolved in 400 ml ether and washed with two 200 ml portions of a 5 percent aqueous solution of sodium hydrogen carbonate to remove the unreacted acid. The ether solution was dried over sodium sulfate, filtered and evaporated. The neutral, residual product was then nitrogen purged at 0.1 mm for 2 hours to remove all the ether. The resulting crude product was found to be essentially 0,0'-diethyl S-(1-propenyl) thiophosphate by NMR. It was obtained in an amount of 6.5 g., i.e., a yield of 31 percent. On distillation in vacuo from a bath of 100° C., 5 g. of the purified product, distilling at 50° (0.1 mm. Hg.) was obtained.

EXAMPLE 6

A mixture of 4.2 grams (0.02 mole) of 0,0'-diethyl S-(1-propenyl)-thiophosphate and 1 gram (0.021 mole) of a methyl mercaptan was irradiated with ultraviolet light in a sealed quartz tube under its own vapor pressure at 17° C. for 22 hours. Gas liquid chromatography of the crude reaction mixture indicated about 90 percent conversion. Distillation in vacuo afforded a pure sample of the mixed diadduct, b.p. 100°–102° C. at 0.15 mm. Hg. The adduct structure,

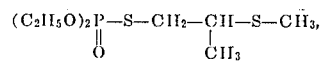

was verified by NMR analysis.

Anal. Calcd. for $C_8H_{19}O_3S_2P$: C, 37.21; H, 7.36; S, 24.80; P, 12.01. Found: C, 37.53; H, 7.72; S, 24.77; P, 11.86.

EXAMPLE 7

A mixture of 2.1 grams (0.01 mole) of 0,0'-diethyl S-(1-propenyl) thiophoshpate and 1.24 grams (0.02 mole) of ethyl mercaptan was irradiated for 15 hours as outlined in Example 4. Excess ethyl mercaptan was removed by vacuum. The residue, 2.52 grams (97 percent yield), was greater than 95 percent pure mixed diadduct,

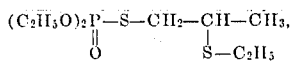

as verified by gas liquid chromatography and NMR analysis.

EXAMPLE 8

A mixture of 0,0'-dimethyl S-(1-propenyl) thiophosphate and methyl mercaptan was reacted as described in Example 6 to yield the mixed diadduct.

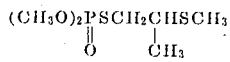

EXAMPLE 9

A mixture of 9.1 grams (0.05 mole) of 0,0'-dimethyl S-(1-propenyl) thiophosphate and 6.2 grams (0.1 mole) of ethyl mercaptan was irradiated for 67 hours. An NMR spectrum of the resulting mixture indicated a complete conversion of the thiophosphate. The mixture was washed with aqueous sodium hydrogen carbonate as described in Example 1, to yield 11.5 g. (94 percent) of neutral crude mixed diadduct. On fractional distillation in vacuo 10 g. (82 percent) of purified adduct, b.p. 90°–91° C. (0.15 mm. Hg.),

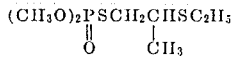

was obtained.

Anal. Calcd. for $C_7H_{17}O_3PS_2$: C, 34.41; H, 7.01 ; S, 26.25. Found: C, 34.60; H, 7.03; S, 26.20

EXAMPLE 10

To 4.5 grams (0.05 mole) of methyl S-(1-propenyl) sulfide, 8.5 grams (0.05 moles) of 0,0'-diethyl thiophosphoric acid was added dropwise with stirring. A mildly exothermic reaction started to take place as indicated by a rise of the mixture's temperature to 35° C. during the addition. After 3 days standing at room temperature, the mixture was dissolved in 100 ml. of ether and extracted with two 25 ml. portions of 5 percent aqueous $NaHCO_3$ solution to remove the unreacted acid. After drying the solution over $Na_2SO_4$ and removing the volatiles in vacuo (1 hr. at 0.1 mm.), 8 g (66 percent) of the slightly yellow mobile liquid mixed diadduct remained. Analysis by NMR established that the diadduct was 0,0'-diethyl S-1-methylthiopropyl thiophosphate.

In contrast to the S-2-methylthiopropyl diadduct of Example 6, the S-1-methylthiopropyl product of the present example underwent the following thermal decomposition on attempted distillation at 0.1 mm. Hg. pressure with a 110° C. silicon bath:

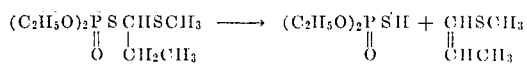

The starting reactant products of the product decomposition were recovered. The adduct was condensed in a dry ice - isopropanol trap, while the acid was collected as a distillate (b.p. 85°–87° C. 0.1 mm. Hg.). Both were identified by their NMR spectra.

EXAMPLE 11

The products of Examples 1, 3, and 6 to 9 were each dissolved in acetone and dispersed in distilled water with X-100 emulsifier (alkyl aryl polyether alcohol) to give spray emulsions of various concentrations. Each of these emulsions were used in standard laboratory insecticidal and miticidal tests as described hereinbelow.

INSECTICIDAL TESTS

Mexican Bean Beetle Tests — Lima bean leaves sprayed on the dorsal and ventral surfaces were offered to ten larvae of the Mexican bean beetle (late second instar) for a 48-hour feeding period. The feeding rate and mortality data were recorded as well as foliage injury if any. The positive standards were 0.05 percent DDT and 0.1 percent methoxychlor, respectively.

Pea Aphid Tests — Adult pea aphids were sprayed and transferred to sprayed pea plants and held for 48-hour mortality determinations. Foliage injury, if any, was recorded. DDT at 0.05 percent concentration was used as the positive standard.

Systemic insecticidal activity was evaluated by applying 20 ml. spray of the sample to the vermiculite substratum of potted pea plants. Forty-eight hours after application the plants were infested with 10 adult pea aphids and mortality determination was made after 5 days. Demeton at 0.01 percent concentration was used as the positive standard.

Miticidal Tests - Spider Mite Tests — Lima bean plants were infested with 50 to 100 adults of the strawberry spider mite, Tetranychus atlanticus, prior to testing. The infested plants were dipped into the test material and held for 5 days. Adult mortality as well as ovicidal action was noted. Aramite and Ovotran were used as positive standards at 0.1 percent concentration.

The results of the various tests are shown in Table I.

TABLE I

| Active ingredient | | | Mortality of insects and mites after test, percent | | | | | |
|---|---|---|---|---|---|---|---|---|
| | | | Mex. bean beetles | | Pea aphids | | Spider mites | |
| Example No. | Structure | Conc., percent | Contact 48 hours | Systemic 5 days | Contact 48 hours | Systemic 5 days | Contact 5 days | Systemic 48 hours |
| 1 | $(C_2H_5O)_2PSCH=CHCH_3$ $\parallel$ O | 0.010 | 100 | 100 | 0 | 100 | 0 | 100 |
| | | 0.005 | 100 | 100 | 0 | 10 | 0 | 100 |
| 3 | $(CH_3O)_2PSCH=CHCH_3$ $\parallel$ O | 0.010 | 100 | 100 | 90 | 100 | 0 | 100 |
| | | 0.005 | 100 | 100 | 80 | 100 | 0 | 100 |
| 6 | $(C_2H_5O)_2PSCH_2CHSCH_3$ $\parallel$ O | 0.010 | 100 | --- | 100 | 100 | 100 | --- |
| | | 0.005 | 10 | 100 | 100 | 100 | 100 | 100 |

TABLE I – Continued

| Example No. | Active ingredient Structure | Conc., percent | Mex. bean beetles Contact 48 hours | Mex. bean beetles Systemic 5 days | Pea aphids Contact 48 hours | Pea aphids Systemic 5 days | Spider mites Contact 5 days | Spider mites Systemic 48 hours |
|---|---|---|---|---|---|---|---|---|
| 7 | $(C_2H_5O)_2\underset{\underset{O}{\parallel}}{P}\,S\,CH_2\underset{\underset{CH_3}{\mid}}{C}H\,S\,C_2H_5$ | 0.010 | 100 | 100 | 100 | 100 | 100 | 100 |
|   |  | 0.005 | 90 | 100 | 100 | 100 | 100 | 100 |
| 8 | $(CH_3O)_2\underset{\underset{O}{\parallel}}{P}\,S\,CH_2\underset{\underset{CH_3}{\mid}}{C}H\,S\,CH_3$ | 0.010 | ----- | ----- | 100 | 100 | 82 | 100 |
|   |  | 0.005 | ----- | ----- | 100 | 100 | 18 | 100 |
| 9 | $(CH_3O)_2\underset{\underset{O}{\parallel}}{P}\,S\,CH_2\underset{\underset{CH_3}{\mid}}{C}H\,S\,C_2H_5$ | 0.010 | 100 | 100 | 100 | 100 | 66 | 100 |
|   |  | 0.005 | 20 | 100 | 100 | 100 | 48 | 100 |

The data of Table I show that the novel sequential diadducts of the present invention are more effective pesticides against aphids and mites than the corresponding monoadducts. The systemic insecticidal and miticidal effectiveness of the present diadducts is particularly high.

EXAMPLE 12

The products of Examples 6–9 were tested as emulsions of various concentrations against the cotton boll weevil, mosquito larvae and corn rootworm.

Contact and systemic tests on the cotton boll weevil were carried out in a manner analogous to the aphid tests described in the previous example.

Tests on the yellow fever mosquito, *Aedes Egypti*, used the apparatus for insecticide assay described in the *Journal of Economic Entomology*, Vol. 53, page 483, in 1960. Twenty-five 4th instar larvae were placed in beakers containing 50 ml. of distilled water. One hundred and fifty mls. of each formulation was added to a beaker containing the mosquito larvae. The larvae were held for 24 hours for mortality observations. These observations were made with the device referred to under test apparatus.

Adult Northern corn rootworms were collected from a field. The beetles were placed on 5 percent sugar solution prior to and after treatment. The samples were dissolved in acetone and applied by means of a microapplicator to the tip of the abdomen of each beetle. Dosages are indicated in the results. The tests were conducted in duplicate, 10 insects per replicate. One microliter of the test emulsion was applied per insect. Mortalities were recorded after 24 hours.

The results of the tests are summarized in Table II.

to be active against the bed bug (Cimer Lecturalius L) in residual tests, the German cockroach (Blatella Germanica L) in contact spray test, fruit flies in Hawaii in spray tests and as a louse toxicant.

EXAMPLE 13

In order to determine the range of toxicity of the compounds prepared in accordance with the present process, various calculated doses of the adducts of methylacetylene were injected via a stomach syringe into adult male mice of the Swiss Webster strain, 30–35 grams in weight. These mice were observed for survival during a two week period. On the basis of the mortality data, the range of acute oral median lethal concentrations, $LD_{50}$'s were estimated. The results are given in Table III.

The data of Table III show that the sequential diadducts of the present invention are surprisingly less toxic to warm-blooded animals than the monoadducts from which they are derived. The data also show that the sequential diadduct of Example 6 has an $LD_{50}$ about 50 times higher than that of the structurally closely related Thiol-Systox. In other words, our diadduct is about 50 times safer to use than the active isomer of the commercial Systox pesticide.

What is claimed is:

1. A process for preparing sequential diadducts of methylacetylene which comprises the steps of (1) adding one mole of a thiophosphoric acid represented by the formula:

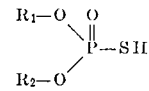

TABLE II

| Example No. | Active ingredient Structure | Conc., percent | Cotton boll weevil mortality, percent Contact | Cotton boll weevil mortality, percent Systemic | Mosquito larvae, percent Conc. | Mosquito larvae, percent Mortality | Corn rootworm Conc., mcg./mcl. | Corn rootworm Mortality, percent |
|---|---|---|---|---|---|---|---|---|
| 6 | $(C_2H_5O)_2\underset{\underset{O}{\parallel}}{P}\,S\,CH_2\underset{\underset{CH_3}{\mid}}{C}H\,S\,CH_3$ | ----- | ----- | ----- | 0.0020 | 82 | 2.5 / 1.0 | 100 / 95 |
| 7 | $(C_2H_5O)_2\underset{\underset{O}{\parallel}}{P}\,S\,CH_2\underset{\underset{CH_3}{\mid}}{C}H\,S\,C_2H_5$ | 0.05 | ----- | ----- | 0.0020 | 100 | 1.0 / 0.5 | 100 / 100 |
| 8 | $(CH_3O)_2\underset{\underset{O}{\parallel}}{P}\,S\,CH_2\underset{\underset{CH_3}{\mid}}{C}H\,S\,CH_3$ | 0.05 | 90 | 80 | 0.0020 | 100 | ----- | ----- |
| 9 | $(CH_3O)_2\underset{\underset{O}{\parallel}}{P}\,S\,CH_2\underset{\underset{CH_3}{\mid}}{C}H\,S\,C_2H_5$ | 0.05 | 20 | 100 | ----- | ----- | ----- | ----- |

The data show that the mixed diadducts are active against the insects tested.

In addition to the above, the product of Example 7, O,O'-diethyl S-2-methylthiopropyl thiophosphate, was tested by the Agricultural Research Service of the U.S. Department of Agriculture. The compound was found wherein each of $R_1$ and $R_2$ is selected from the group consisting of $C_1$–$C_5$ alkyl, $C_6$–$C_{10}$ aryl or alkaryl, $C_6$–$C_{10}$ halo-substituted aryl, and $C_6$–$C_{10}$ nitro-substituted aryl to methylacetylene to form a monoadduct, S-propenyl thiophosphate, and (2) reacting said monoadduct with

TABLE III

| Example No. | Experimental compound (reference) Structure | Dosage, mg./kg.[a] | Mortality, No. dead/ No. dosed | Estimated LD$_{50}$, mg./kg. |
|---|---|---|---|---|
| 1 | $(C_2H_5O)_2\underset{\underset{O}{\|}}{P}SCH{=}CHCH_3$ | 1<br>10<br>25 | 0<br>1/2<br>2/2 | 10 |
| 3 | $(CH_3O)_2\underset{\underset{O}{\|}}{P}SCH{=}CHCH_3$ | 25<br>50<br>100 | 0/2<br>1/2<br>2/2 | 50 |
| 6 | $(C_2H_5O)_2\underset{\underset{O}{\|}}{P}SCH_2\underset{\underset{CH_3}{\|}}{C}HSC_2H_5$ | 50<br>75<br>100 | 0/2<br>0/2<br>2/2 | 75–100 |
| 9 | $(CH_3O)_2\underset{\underset{O}{\|}}{P}SCH_2\underset{\underset{CH_3}{\|}}{C}HSC_2H_5$ | 50<br>100<br>200 | 0/2<br>1/2<br>2/2 | 100 |
| (Thiol-Systox) | $(C_2H_5O)_2\underset{\underset{O}{\|}}{P}SCH_2CH_2SC_2H_5$ | | | [b]1.5 |

[a] Expressed as mg. active compound per body kg. test animal.
[b] Published on page 343 of the Schrader monograph as acute oral median lethal dose for rats.

an organic thiol represented by the formula $$R_3SH$$

wherein $R_3$ is selected from the group consisting of $C_1$–$C_5$ alkyl, $C_6$–$C_{10}$ aryl, aralkyl or alkaryl, $C_6$–$C_{10}$ halo-substituted aryl, and $C_6$–$C_{10}$ nitro-substituted aryl
in the presence of a free radical initiator at temperatures ranging from about −80° C to about +50° C, to form a sequential diadduct, of the formula $$\underset{R_2O}{\overset{R_1O}{\diagdown}}\underset{}{\overset{\overset{O}{\|}}{P}}-S-CH_2-\underset{\underset{CH_3}{\|}}{C}H-S-R_3$$

2. The process of claim 1 wherein the molar ratio of organic thiol to S-propenyl thiophosphate is about 1:1 to 10:1.

3. The process of claim 1 wherein the first step to form a monoadduct is carried out using a 50 percent to 200 percent excess of thiophosphoric acid above the methylacetylene.

4. The process of claim 1 wherein the reaction temperature of both steps is between −80° C. to about +50° C.

5. A process for preparing mixed diadducts of methylacetylene which comprises reacting an S-propenyl thiophosphate represented by the formula $$\underset{R_2O}{\overset{R_1O}{\diagdown}}\underset{}{\overset{\overset{O}{\|}}{P}}-S-CH{=}\underset{\underset{CH_3}{\|}}{C}H$$

wherein each of $R_1$ and $R_2$ is $C_1$–$C_5$ alkyl, with an organic thiol represented by the formula $$R_3SH$$

wherein $R_3$ is $C_1$–$C_5$ alkyl, in the presence of a free radical initiator at temperatures ranging from about −80° C. to about +50° C.

\* \* \* \* \*